(12) United States Patent
Ganapathiappan et al.

(10) Patent No.: US 8,674,001 B2
(45) Date of Patent: Mar. 18, 2014

(54) ENCAPSULATED PIGMENTS CONTAINING CROSS-LINKING AGENT

(75) Inventors: Sivapackia Ganapathiappan, Los Altos, CA (US); Howard S. Tom, San Jose, CA (US); Laurie S. Mittelstadt, Belmont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/384,586

(22) PCT Filed: Jul. 30, 2009

(86) PCT No.: PCT/US2009/052257
§ 371 (c)(1),
(2), (4) Date: Jan. 17, 2012

(87) PCT Pub. No.: WO2011/014173
PCT Pub. Date: Feb. 3, 2011

(65) Prior Publication Data
US 2012/0116012 A1    May 10, 2012

(51) Int. Cl.
*C08K 9/00* (2006.01)
*C09D 11/00* (2006.01)

(52) U.S. Cl.
USPC .......................... 523/205; 523/200; 523/160

(58) Field of Classification Search
USPC ......................................... 523/160, 200, 205
See application file for complete search history.

(56) References Cited

U.S. PATENT DOCUMENTS

| | | | |
|---|---|---|---|
| 3,884,871 A * | 5/1975 | Herman et al. ................ 523/202 |
| 4,294,740 A * | 10/1981 | Mizuguchi et al. ............ 524/458 |
| 4,377,661 A | 3/1983 | Wright et al. |
| 5,032,425 A * | 7/1991 | Livsey et al. ................. 427/487 |
| 5,358,821 A * | 10/1994 | Bertrand et al. .......... 430/137.11 |
| 5,648,124 A | 7/1997 | Sutor |
| 5,852,073 A * | 12/1998 | Villiger et al. ................. 523/161 |
| 5,885,743 A * | 3/1999 | Takayanagi et al. ....... 430/108.6 |
| 6,017,670 A * | 1/2000 | Hashizume et al. ....... 430/109.2 |
| 6,444,261 B1 | 9/2002 | Plaksine et al. |
| 6,719,932 B2 | 4/2004 | Clikeman et al. |
| 6,908,186 B2 | 6/2005 | Zheng et al. |
| 7,192,542 B2 | 3/2007 | Ugazio |
| 7,411,008 B2 | 8/2008 | Tucker et al. |
| 7,449,501 B2 | 11/2008 | Uerz et al. |
| 7,531,582 B2 | 5/2009 | Toma et al. |
| 2003/0029355 A1* | 2/2003 | Miyabayashi ............. 106/31.27 |
| 2003/0195274 A1* | 10/2003 | Nakamura et al. ............ 523/160 |
| 2004/0157956 A1 | 8/2004 | Vincent et al. |
| 2006/0222851 A1* | 10/2006 | Miyabayashi et al. ........ 428/408 |
| 2006/0241209 A1 | 10/2006 | Madle et al. |
| 2007/0126839 A1 | 6/2007 | Kelly-Rowley et al. |
| 2007/0227401 A1* | 10/2007 | Ganschow et al. ........... 106/400 |
| 2008/0026221 A1* | 1/2008 | Vincent et al. ................ 428/407 |
| 2008/0250971 A1 | 10/2008 | Ganapathiappan |
| 2008/0257212 A1 | 10/2008 | Ganapathiappan |
| 2008/0269374 A1 | 10/2008 | Ganapathiappan |

FOREIGN PATENT DOCUMENTS

| | | |
|---|---|---|
| CN | 1954040 | 4/2007 |
| CN | 101389718 | 3/2009 |
| EP | 1153991 | 11/2001 |
| EP | 1897919 | 3/2008 |
| JP | 06-049109 | 2/1994 |
| WO | WO 2007/048553 | 5/2007 |

OTHER PUBLICATIONS

International Search Report and Written Opinion for PCT/US2009/052257 dated Apr. 22, 2010 (12 pages).
Supplementary European Search Report for Application No. 09847916.5 dated Nov. 22, 2013 (4 pages).

* cited by examiner

*Primary Examiner* — Alexander Kollias
(74) *Attorney, Agent, or Firm* — Sandra B. Beccarelli

(57) ABSTRACT

Polymer-encapsulated pigment which includes a pigment core and a polymer shell, the shell being a polymerized polymer including hydrophobic monomers and acidic monomers, and also including a specific cross-linking agent.

8 Claims, No Drawings

ENCAPSULATED PIGMENTS CONTAINING CROSS-LINKING AGENT

BACKGROUND

There are several reasons that ink-jet printing has become a popular way of recording images on various media surfaces, particularly paper. Some of these reasons include low printer noise, capability of high-speed recording, and capability of multi-color recording. Additionally, these advantages can be obtained at a relatively low price to consumers. Though there has been great improvement in ink-jet printing, accompanying this improvement are increased demands by consumers in this area, e.g., higher speeds, higher resolution, full color image formation, increased stability, etc. As new ink-jet inks and print engines are developed, there have been several traditional characteristics to consider when evaluating the ink in conjunction with a printing surface or substrate. Such characteristics include edge acuity and optical density of the image on the surface, gloss, dry time of the ink on the substrate, adhesion to the substrate, lack of deviation in ink droplet placement, presence of all dots, resistance of the ink after drying to water and other solvents, long term storage stability, and long term reliability without pen material degradation or nozzle clogging. Though the above list of characteristics provides a worthy goal to achieve, there are difficulties associated with satisfying all of the above characteristics. Accordingly, investigations continue into developing ink formulations that can be printed with high image quality.

DETAILED DESCRIPTION

Before the present invention is disclosed and described, it is to be understood that this invention is not limited to the particular process steps and materials disclosed herein because such process steps and materials may vary somewhat. It is also to be understood that the terminology used herein is used for the purpose of describing particular embodiments only. The terms are not intended to be limiting because the scope of the present invention is intended to be limited only by the appended claims and equivalents thereof.

It must be noted that, as used in this specification and the appended claims, the singular forms "a," "an," and "the" include plural referents unless the context clearly dictates otherwise.

Concentrations, amounts, and other numerical data may be expressed or presented herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "0.1 wt % to 5 wt %" should be interpreted to include not only the explicitly recited concentration of 0.1 wt % to 5 wt %, but also include individual concentrations and the sub-ranges within the indicated range. Thus, included in this numerical range are individual concentrations, such as 1 wt %, 2 wt %, 3 wt %, and 4 wt %, and sub-ranges, such as from 0.1 wt % to 1.5 wt %, 1 wt % to 3 wt %, from 2 wt % to 4 wt %, from 3 wt % to 5 wt %, etc. This same principle applies to ranges reciting only one numerical value. For example, a range recited as "less than 5 wt %" should be interpreted to include all values and sub-ranges between 0 wt % and 5 wt %. Furthermore, such an interpretation should apply regardless of the breadth of the range or the characteristics being described. As used herein, "effective amount" refers to at least the minimal amount of a substance or agent, which is sufficient to achieve a desire effect. For example, an effective amount of an "ink vehicle" is at least the minimum amount required in order to create an ink composition, while maintaining properties necessary for the ink composition.

Generally, attempts to improve printed ink water-fastness and fade resistance have led to increasing use of pigments as the colorant of an ink-jet ink. Since resistance to smear and smudge, on both plain paper (highlighter smear, thumb smudge) and brochure/photo media (resistance to scuff and scratch), are major challenges when using pigmented inks, various solutions have been attempted to eliminate or reduce these drawbacks, e.g., the addition of polymeric binders to the ink. Such binders, when associated with the pigment particles on the print media, are expected to increase durability by forming a protective layer over the particles. To ensure that the pigment and the binder are closely associated on the print media, an excess of binder is generally required; this leads to a high amount of solids in the ink. However, all of these otherwise desirable attributes (e.g., high solids, low $T_g$, hydrophobicity) typically lead to jettability problems in water-based thermal ink-jet inks.

Accordingly, there is interest in developing the ability to achieve close association of pigment particles and polymeric binder on a print medium without the need for excess binder in the ink, and without detrimentally affecting ink viscosity or drop ejection. Such interest has lead to general encapsulation of pigments with polymers. However, with this background in mind, it has been recognized that such encapsulation does not generally provide a uniform and/or fully encapsulated pigment. Despite the fact that some in the literature proclaim uniform and/or complete encapsulation, this is not typically the case. Such lack of uniformity and/or full encapsulation lowers overall print performance.

It has been discovered that encapsulating pigment with a combination of polymeric shell and cross-linking agent can provide full encapsulation and substantially uniformity of the pigments. Additionally, such combination of polymeric shell and cross-linking agent provide better printability performances for ink compositions containing them.

In accordance with this, the present disclosure is drawn to encapsulated pigments, compositions and methods using combination of polymeric shell and cross-linking agent for encapsulating pigments for use in ink-jet ink applications. It is noted that when discussing the present compositions or associated methods, each of these discussions can be considered applicable to each of these embodiments, whether or not they are explicitly discussed in the context of that embodiment. Thus, for example, in discussing a monomer present in a polymer encapsulated pigment, such a monomer can also be used in a method for encapsulating the pigment, and vice versa.

In an embodiment, the present disclosure refers to a polymer-encapsulated pigment which includes a pigment core and a polymer shell. In an embodiment, the polymer shell is a polymerized polymer including hydrophobic monomers and acidic monomers and including, also, a cross-linking agent.

In an embodiment, the cross-linking agent is selected according to the formula I or II,

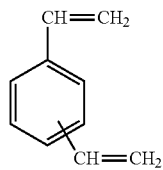

wherein X is (C(O)O—R'—O(O)C), (O—R'—O), (NH—C (O)—R'—C(O)NH), (C(O)NH—R'—NHC(O)), (NH—R'—NH) or (CH$_2$—C(O)O—R'—OC(O)—CH$_2$); wherein R' is a divalent linking group selected from the group consisting of alkenyl, arylene, alkylene, alkenoxy or alkynoxy groups and wherein R is H or an alkyl group.

Additionally, in an embodiment, the present disclosure refers to a method of encapsulating pigments including the steps of dispersing a pigment in an aqueous solution to form a pigment dispersion, adding hydrophobic and acidic monomers to the pigment dispersion, adding a cross-linking agent to the pigment dispersion, and polymerizing the monomers into a polymer shell in the presence of the pigment to form an encapsulated pigment.

Further, in an embodiment, the present disclosure provides ink-jet inks including the encapsulated pigments described herein. In another embodiment, the encapsulated pigments described herein can be any pigment known in the art that imparts color. Such pigments include, without limitation, black including carbon black, magenta, yellow, blue, cyan, etc. Additionally, the pigments may be used with a separate dispersant, e.g., surfactant or polymer dispersant, and/or can be self-dispersed, e.g., small molecule- or polymer-modified pigment surface. In another embodiment, the present disclosure refers to an ink-jet inks for printing images, an ink-jet ink which includes an ink vehicle and a polymer-encapsulated pigment such as described herein dispersed in the ink vehicle.

In one embodiment, the polymer-encapsulated pigment can be formulated and dispersed in an ink-jet ink composition, such as a piezoelectric ink-jet ink or a thermal ink-jet ink. These polymer-encapsulated pigments are jetted well from both types of ink-jet architecture, but are particularly adapted for the more stringent requirements of thermal ink-jet applications.

As used herein, the term "encapsulate" or "encapsulated" includes partial to complete encapsulation of a pigment particulate with a polymeric shell. This can be done by adsorption or by reacting the polymeric shell on the surface of the particulate.

In accordance with an embodiment of the present invention, the polymer-encapsulated pigment, has a size which is between from 30 nm to 400 nm in diameter. In another embodiment, the polymer-encapsulated pigment, has a size which is between from 100 nm to 250 nm. In an embodiment, the polymer-encapsulated pigment has bulk density ranging from about 0.90 g/cm$^3$ to about 3 g/cm$^3$. In an embodiment, the polymer-encapsulated pigment has a surface dielectric constant ranging from about 1.5 to about 3.0, at room temperature. In an embodiment, the polymer-encapsulated pigment has a surface dielectric constant ranging from about 2.3 to about 2.8. Further, in an embodiment, such an encapsulated pigment can have a calculated $T_g$ from about −40° C. to about 125° C. In one embodiment, the calculated $T_g$ can be from about 0° C. to about 75° C., and in one aspect, can be from 35° C. to about 50° C.

In an embodiment, the cross-linking agent has the general formula I or the formula II, wherein

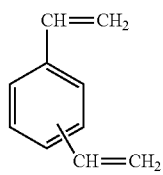

wherein X is (C(O)O—R'—O(O)C), (O—R'—O), (NH—C (O)—R'—C(O)NH), (C(O)NH—R'—NHC(O)), (NH—R'—NH) or (CH$_2$—C(O)O—R'—OC(O)—CH$_2$); wherein R' is a divalent linking group selected from the group consisting of alkenyl, arylene, alkylene, alkenoxy or alkynoxy groups and wherein R is H or an alkyl group. In an embodiment, in the cross-linking agent formula (I), X is (C(O)O—R'—O(O)C), (O—R'—O), (NH—C(O)—R'—C(O)NH), or (CH$_2$—C(O) O—R'—OC(O)—CH$_2$).

In an embodiment, R' is a substituted alkenyl, arylene, alkylene, alkenoxy or alkynoxy groups. In another embodiment, R' is a substituted alkenyl, arylene or alkylene groups. In another embodiment, R' is a substituted alkenyl, arylene, alkylene, alkenoxy or alkynoxy groups containing from 2 to about 20 carbon atoms; in another embodiment, containing from 4 to 10 carbon atoms; and in another embodiment, containing from 4 to 8 carbon atoms. In another embodiment, R' is (CH$_2$CH$_2$O), (CH$_2$CH$_2$OCH$_2$CH$_2$), (CH$_2$CH$_2$O)$_3$, (CH$_2$)$_6$ or (CH$_2$)$_2$.

In an embodiment, R is H or an alkyl group. In an embodiment, R is H or a lower alkyl group. In another embodiment, R is an alkyl group containing from 1 to 20 carbon atoms. In another embodiment, R is an alkyl group containing from 1 to 10 carbon atoms; and in another embodiment, R is an alkyl group containing from 1 to about 4 carbon atoms. In another embodiment, R is H or CH$_3$.

In another embodiment, the cross-linking agent is selected from the group consisting of ethylene glycol dimethacrylate, di(ethylene glycol)dimethacrylate, triethylene glycol dimethacrylate, pentaerythritol triacrylate, pentaerythritol tetracrylate, bisphenol dimethacrylate, 1,6-hexanediol diacrylate, 1,6-hexanediol dimethacrylate, N,N'-ethylenebis (acrylamide), 1,6-hexanediol divinyl ether, diallyl maleate, diallyl phthalate, 1,3-divinylbenzene and 1,4-divinylbenzene. In another embodiment, the cross-linking agent is selected from the group consisting of ethylene glycol dimethacrylate, ethylene glycol diacrylate, pentaerythritol tri- or tetra acrylate, diethylene glycol dimethacrylate, diethylene glycol diacrylate, triethylene glycol dimethacrylate, triethylene glycol diacrylate. In another embodiment, the cross-linking agent is selected from the group consisting of ethylene glycol dimethacrylate, pentaerythritol tetra-acrylate, ethylene glycol dimethacrylamide, divinyl benzene, or other monomers with polymerizable di- or polyfunctional groups.

Without being bound by the theory, it is believed that this cross-linking agent can aid in maintaining the integrity of encapsulated particle under the high thermal shear conditions that occur during thermal ink-jet printing, while not adversely impacting its room temperature film-forming properties.

The term "alkyl" as used herein means a branched, unbranched, or cyclic saturated hydrocarbon group, which can contains from 1 to about 50 carbon atoms, or 1 to about 40 carbon atoms, or 1 to about 30 carbon atoms for example. Alkyls include, but are not limited to, methyl, ethyl, n-propyl, isopropyl, n-butyl, isobutyl, t-butyl, octyl, and decyl, for example, as well as cycloalkyl groups such as cyclopentyl, and cyclohexyl, for example. The term "lower alkyl" means an alkyl group having from 1 to 6 carbon atoms. The term "higher alkyl" means an alkyl group having more than 6 carbon atoms, for example, 7 to about 50 carbon atoms, or 7 to about 40 carbon atoms, or 7 to about 30 carbon atoms or more. As used herein, the term "substituted alkyl" means an alkyl substituted with one or more substituent groups. The term "heteroalkyl" means an alkyl in which at least one carbon atom is replaced with a heteroatom. If not otherwise indicated, the term "alkyl" includes unsubstituted alkyl, substituted alkyl, lower alkyl, and heteroalkyl.

As used herein, the term "alkenyl" means a linear, branched or cyclic hydrocarbon group of 2 to about 50 carbon atoms, or 2 to about 30 carbon atoms, or 2 to about 20 carbon atoms or more containing at least one double bond, such as ethenyl, n-propenyl, isopropenyl, n-butenyl, isobutenyl, octenyl, decenyl, tetradecenyl, hexadecenyl, eicosenyl, and tetracosenyl, for example. The term "lower alkenyl" means an alkenyl having from 2 to 6 carbon atoms. The term "higher alkenyl" means an alkenyl group having more than 6 carbon atoms, for example, 7 to about 50 carbon atoms, or 7 to about 40 carbon atoms, or 7 to about 30 carbon atoms or more. The term "substituted alkenyl" means an alkenyl or cycloalkenyl substituted with one or more substituent groups. The term "heteroalkenyl" means an alkenyl or cycloalkenyl in which at least one carbon atom is replaced with a heteroatom. If not otherwise indicated, the term "alkenyl" includes unsubstituted alkenyl, substituted alkenyl, lower alkenyl, and heteroalkenyl.

The term "alkylene" as used herein means a linear, branched or cyclic alkyl group in which two hydrogen atoms are substituted at locations in the alkyl group, having 1 to about 50 carbon atoms, or 1 to about 30 carbon atoms, or 1 to about 20 carbon atoms. Alkylene linkages thus include $-CH_2CH_2-$ and $-CH_2CH_2CH_2-$, for example, as well as substituted versions thereof wherein one or more hydrogen atoms are replaced with a non-hydrogen substituent. The term "lower alkylene" refers to an alkylene group containing from 2 to 6 carbon atoms. The term "higher alkylene" means an alkylene group having more than 6 carbon atoms, for example, 7 to about 50 carbon atoms, or 7 to about 40 carbon atoms, or 7 to about 30 carbon atoms or more. As used herein, the term "substituted alkylene" means an alkylene substituted with one or more substituent groups. As used herein, the term "heteroalkylene" means an alkylene wherein one or more of the methylene units are replaced with a heteroatom. If not otherwise indicated, the term "alkylene" includes heteroalkylene.

The term "alkenoxy" as used herein means an alkenyl group bound to another chemical structure through a single, terminal ether linkage, having 1 to about 50 carbon atoms, or 1 to about 40 carbon atoms, or 1 to about 30 carbon atoms. As used herein, the term "lower alkenoxy" means an alkenoxy group, wherein the alkenyl group contains from 2 to 6 carbon atoms, and includes, for example, ethenoxy, n-propenoxy, isopropenoxy, and t-butenoxy. The term "higher alkenoxy" means an alkenoxy group wherein the alkenyl group has more than 6 carbon atoms, for example, 7 to about 50 carbon atoms, or 7 to about 40 carbon atoms, or 7 to about 30 carbon atoms or more. As used herein, the term "substituted alkenoxy" means an alkenoxy substituted with one or more substituent groups. The term "heteroalkenoxy" means an alkenoxy in which at least one carbon atom is replaced with a heteroatom. If not otherwise indicated, the term "alkenoxy" includes unsubstituted alkenoxy, substituted alkenoxy, lower alkenoxy, higher alkenoxy and heteroalkenoxy.

The term "alkynoxy" as used herein means an alkynyl group bound to another chemical structure through a single, terminal ether linkage, having 1 to about 50 carbon atoms, or 1 to about 40 carbon atoms, or 1 to about 30 carbon atoms. As used herein, the term "lower alkynoxy" means an alkynoxy group, wherein the alkynyl group contains from 2 to 6 carbon atoms, and includes, for example, ethynoxy, n-propynoxy, isopropynoxy, and t-butynoxy. The term "higher alkynoxy" means an alkynoxy group wherein the alkynyl group has more than 6 carbon atoms, for example, 7 to about 50 carbon atoms, or 7 to about 40 carbon atoms, or 7 to about 30 carbon atoms or more. As used herein, the term "substituted alkynoxy" means an alkynoxy substituted with one or more substituent groups. The term "heteroalkynoxy" means an alkynoxy in which at least one carbon atom is replaced with a heteroatom. If not otherwise indicated, the term "alkynoxy" includes unsubstituted alkynoxy, substituted alkynoxy, lower alkynoxy, higher alkynoxy and heteroalkynoxy.

The term "arylene" means a group containing divalent aromatic ring system, i.e., a divalent aryl group. The term "aryl" means a group containing a single aromatic ring or multiple aromatic rings that are fused together, directly linked, or indirectly linked (such that the different aromatic rings are bound to a common group such as a methylene or ethylene moiety). Aryl groups described herein may contain, but are not limited to, from 5 to about 50 carbon atoms, or 5 to about 40 carbon atoms, or 5 to 30 carbon atoms or more. Aryl groups include, for example, phenyl, naphthyl, anthryl, phenanthryl, biphenyl, diphenylether, diphenylamine, and benzophenone. The term "substituted aryl" refers to an aryl group including one or more substituent groups. The term "heteroaryl" means an aryl group in which at least one carbon atom is replaced with a heteroatom. If not otherwise indicated, the term "aryl" includes unsubstituted aryl, substituted aryl, and heteroaryl.

The term "substituted" means that a hydrogen atom of a compound or moiety is replaced by another atom such as a carbon atom or a heteroatom, which is part of a group referred to as a substituent. Substituents include, for example, alkyl, alkoxy, aryl, aryloxy, alkenyl, alkenoxy, alkynyl, alkynoxy, thioalkyl, thioalkenyl, thioalkynyl, and thioaryl groups.

The term "heteroatom" as used herein means nitrogen, oxygen, phosphorus or sulfur. The terms "halo" and "halogen" mean a fluoro, chloro, bromo, or iodo substituent. The term "cyclic" means having an alicyclic or aromatic ring structure, which may or may not be substituted, and may or may not include one or more heteroatoms. Cyclic structures include monocyclic structures, bicyclic structures, and polycyclic structures. The term "alicyclic" is used to refer to an aliphatic cyclic moiety, as opposed to an aromatic cyclic moiety.

The phrase "aromatic ring system" or "aromatic" as used herein includes monocyclic rings, bicyclic ring systems, and polycyclic ring systems, in which the monocyclic ring, or at least a portion of the bicyclic ring system or polycyclic ring system, is aromatic (exhibits, e.g., π-conjugation). The monocyclic rings, bicyclic ring systems, and polycyclic ring systems of the aromatic ring systems may include carbocyclic rings and/or heterocyclic rings. The term "carbocyclic ring" denotes a ring in which each ring atom is carbon. The term "heterocyclic ring" denotes a ring in which at least one ring atom is not carbon and includes 1 to 4 heteroatoms.

The phrase "at least" as used herein means that the number of specified items may be equal to or greater than the number recited. The phrase "about" as used herein means that the number recited may differ by plus or minus 10%; for example, "about 5" means a range of 4.5 to 5.5. The term "between" when used in conjunction with two numbers such as, for example, "between about 2 and about 50" includes both of the numbers recited. Moreover, examples herein are intended to be illustrative only and are presented for discussion purposes and not by way of limitation.

In an embodiment, the present disclosure refers to a polymer-encapsulated pigment which includes a pigment core and a polymer shell. As used herein, "pigment" generally includes organic and inorganic pigment colorants, magnetic particles, aluminas, silicas, and/or other ceramics, organometallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one embodiment, however, the pigment is a pigment colorant. In an embodiment, the pigment is an organic or an inorganic pigment colorant.

In an embodiment, pigments can include color-imparting particulates and other substance that may be suspended or solvated in a liquid vehicle with the polymer-encapsulated pigments in accordance with embodiments of the present invention. Pigments that can be used include self-dispersed pigments, dispersant-dispersed pigments, raw pigments, etc. Self-dispersed pigments included those that have been chemically surface modified with a charge or a polymeric grouping. This chemical modification aids the pigment in becoming and/or substantially remaining dispersed in a liquid vehicle. The pigment can also be a dispersant-dispersed pigment that often utilizes a dispersant (which can be a polymer, an oligomer or a surfactant) in the liquid vehicle and/or in the pigment that utilizes a physical coating to aid the pigment in becoming and/or substantially remaining dispersed in a liquid vehicle. With respect to the other particulates that can be used, examples include semi-metal and metal particulates, semi-metal oxide and metal oxide particulates, dispersible silicates and glass particulates, ferromagnetic and other magnetic particulates, whether or not such particulates impart color.

In an embodiment, pigments are from about 5 nm to about 10 µm in size depending on the dispersing medium. In an embodiment, pigments are less than 500 nm in size for dispersion in water. The sizing of each pigment can be produced through a shearing mechanism, depending on material, and includes, for example, milling, microfluidization and sonification.

In an embodiment, the pigment particles are dispersed in a medium such as water. This is accomplished by shearing the pigment in the presence of the medium and a surfactant, dispersing polymer or other dispersant. The amount and type of dispersant required normally depends on the shearing process, medium and pigment material.

Though any color or type of pigment can be used, color organic pigments or black carbon pigments are exemplified herein in accordance with embodiments of the present invention. The carbon pigment can be almost any commercially available carbon pigment that provides acceptable optical density and print characteristics. Carbon pigments suitable for use in the present invention include, without limitation, carbon black, graphite, vitreous carbon, charcoal, and combinations thereof.

In one aspect of the present invention, the carbon pigment is a carbon black pigment. Such carbon black pigments can be manufactured by a variety of known methods such as a channel method, a contact method, a furnace method, an acetylene method, or a thermal method, and are commercially available from such vendors as Cabot Corporation, Columbian Chemicals Company, Degussa AG, and E.I. duPont de Nemours and Company. Examples of suitable commercially available carbon blacks include No. 2300, No. 900, MCF88, No. 33, No. 40, No. 45, No. 52, MA8, No. 2200B, Raven 1255, Regal 400R, Regal 330R, Regal 660 R, Mogul L, Color Black FW1, Color Black FW18, Color Black S170, Color Black S 150, Printex 35, and Printex U. Other suitable carbon black pigments include, without limitation, Cabot pigments such as Monarch®1400, Monarch®900, Monarch®880, Monarch®800, CAB-O-JET®200; Columbian pigments such as Raven®7000, Raven®5750, Raven®5250, and Raven®3500; Degussa pigments such as Color Black FW 200, Raven®FW 1, Special Black 6, Special Black 4A, Special Black 4, Printex®U and Printex®140V.

Alternatively, organic colored pigments can also be encapsulated with a polymer in accordance with embodiments of the present invention. Exemplary pigments that are suitable for use in accordance with embodiments of the present invention include azo pigments such as azo lake pigments, insoluble azo pigments, and condensed azo pigments; as well as polycyclic pigments such as phthalocyanine pigments; quinacridone pigments, dioxazine pigments, and anthraquinone pigments. Specific pigments that are suitable for use include Pigment Blue 15:3, Pigment Green 36, Pigment Blue 15:6, Pigment Red 177, and/or Pigment Red 208 (from DIC); Pigment Red 168, Pigment Violet 23, Pigment Yellow 155, and/or Pigment Violet 19 (from Clariant); and Pigment Red 254 (from Ciba). Examples of other pigments from these and other manufacturers that can be used include C.I. Pigment Yellow 1, C.I. Pigment Yellow 2, C.I. Pigment Yellow 3, C.I. Pigment Yellow 13, C.I. Pigment Yellow 16, Pigment Yellow 138, Pigment Yellow 128 and the like; C.I. Pigment Red 5, C.I. Pigment Red 7, C.I. Pigment Red 12, C.I. Pigment Red 57 (Ca) and the like; C.I. Pigment Blue 1, C.I. Pigment Blue 2, C.I. Pigment Blue 16, C.I. Pigment Blue 22, C.I. Vat Blue 4, C.I. Vat Blue 6, and the like; carbon black pigment; and other pigments whose performance properties are satisfactory when formulated for the present invention are considered to be within its scope. Manufacturers of pigments that provide suitable pigments, some of which have been previously listed, include DIC, Cabot, Orient, BASF, Ciba, Heubach and Clariant.

In an embodiment, the present disclosure refers to a polymer-encapsulated pigment which includes a pigment core and a polymer shell. In an embodiment, the polymer shell is a polymerized polymer including hydrophobic monomers and acidic monomers. The monomers described herein can be any of any number of compounds capable of forming a polymer.

By "polymer shell", it is meant herein a layer of polymer or of latex material that is deposited on or attached to the surface of a pigment particle, or alternatively, is attached to an intermediate bridging layer which is deposited on the surface of the pigment. This polymer shell can be attached or deposited on the pigment particle or on a bridging layer deposited on the pigment particle. If an environmentally sensitive bridging layer is used, once the polymer encapsulation shell or layer is formed, the change of the environmental conditions that brought about the formation of the bridging layer is often of little consequence, and the polymer encapsulation shell acts to protect the bridging layer from becoming substantially resolubilized. It is noted that in accordance with embodiments of the present invention, the polymer encapsulation shell is applied as a mixture of monomers and a polymer dissolved therein, and then once on the surface of the pigment (or bridging layer), the monomers are polymerized and the pre-existing polymer and newly polymerized monomers form the polymer encapsulation shell. When referring to a "polymer" that is admixed or dissolved in a monomer mix for coating a pigment particle, this term includes any polymeric or oligomeric material that raises the viscosity of a monomer mix sufficient to increase the resultant capsule thickness.

The thickness of the polymer shell can be any suitable thickness. However, in an embodiment, the polymer shell has an average thickness ranging from about 2 nm to about 100 nm. In another embodiment, the polymer shell has an average thickness ranging from about 20 nm to about 80 nm.

Suitable polymers can have any weight average molecular weight that is functional, but in one embodiment, the average molecular weight is from 5,000 Mw to 2,000,000 Mw. In another embodiment, the average molecular weight is from 25,000 Mw to 500,000 Mw.

Further, in an embodiment, the polymer-encapsulated pigment solids can be encapsulated by a copolymer having an acid number in the range of from 1 to 220 mg KOH/g, in another embodiment, from 5 to 150 mg KOH/g or in another embodiment, from 50 to 100 mg KOH/g.

In an embodiment, the polymer-encapsulated pigment includes a pigment core and a polymer shell, such polymer shell is a polymerized polymer including hydrophobic monomers and acidic monomers.

In an embodiment, the hydrophobic monomer of the polymer shell of the encapsulated pigment is present in an amount representing up to 99 wt % of the total amount of monomers forming the polymer shell. In another embodiment, the hydrophobic monomer of the polymer shell of the encapsulated pigment is present in an amount representing from about 70 wt % to about 98 wt % of the total amount of monomers forming the polymer shell. In another embodiment, the hydrophobic monomer of the polymer shell is present in an amount representing from about 80 wt % to about 95 wt % of the total amount of monomers forming the polymer shell.

In an embodiment, the hydrophobic monomers of the polymer shell of the encapsulated pigment are hydrophobic acrylic monomers.

Suitable hydrophobic monomers generally include monomers known in the latex arts for synthesizing latexes that generally are not solvated by water. In an embodiment, hydrophobic monomers contain free-radically polymerizable vinyl groups. In another embodiment, the hydrophobic monomers consist essentially of an acrylate, a methacrylate or other vinyl-containing monomers such as styrene. In another embodiment, the hydrophobic monomers are selected from the group consisting of methyl methacrylate, methyl acrylate, ethyl methacrylate, propyl methacrylate, butyl methacrylate, hexyl methacrylate, 2-ethylhexyl methacrylate, lauryl methacrylate, octadecyl methacrylate, isobornyl methacrylate, vinyl acetate, methyl acrylate, ethyl acrylate, propyl acrylate, butyl acrylate, hexyl acrylate, 2-ethylhexyl acrylate, lauryl acrylate, octadecyl acrylate, isobornyl acrylate, styrene, methylstyrene, vinylbenzyl chloride, butyl vinyl ether, and combinations thereof. In another embodiment, the hydrophobic monomers are selected from the group consisting of methyl methacrylate, ethyl methacrylate, propyl methacrylate, butyl methacrylate, hexyl methacrylate, 2-ethylhexyl methacrylate, lauryl methacrylate, octadecyl methacrylate, isobornyl methacrylate, and styrene.

In an embodiment, the acidic monomer of the polymer shell of the encapsulated pigment is present in an amount ranging from about 0.5 wt % to about 20 wt % of all of the monomers forming the polymer shell. In another embodiment, the acidic monomer of the polymer shell is present in an amount representing from about 1 wt % to about 10 wt % of all of the monomers forming the polymer shell; in another embodiment, in an amount representing from about from about 3 wt % to about 6 wt % of all of the monomers forming the polymer shell.

In an embodiment, non-limiting examples of suitable acidic monomers include acrylic acid, methacrylic acid, methacryloyloxyethyl succinate or phosphate, itaconic acid, maleic acid, vinyl benzoic acid, styrene sulfonate sodium salt, or derivatives thereof, or combinations thereof. In another embodiment, at least one acidic monomer is selected from the group consisting of acrylic acid, methacrylic acid, vinyl benzoic acid, and methacryloyloxyethyl-succinate.

Without being bound by the theory, it is believed that the acidic monomers may advantageously provide stability to the polymer shell of the encapsulated pigment so that they are stable in water. More particularly, the acidic monomers incorporate charges to the polymer shell, which contribute to their stability. The charge of the particles may be further enhanced by raising the pH of the medium on which the encapsulated pigment will be established to convert —COOH functional groups of the acid into a salt form. In an embodiment, other monomers, that can increase the stability, might be present in the polymer shell of the encapsulated pigment, which include acrylamide and vinylpyrrolidone.

In another embodiment, mixtures of the monomers may be used to adjust the glass transition temperature ($T_g$) of the polymer shell of the encapsulated pigment and, thus, to adjust the effectiveness of the printed coating composition. In an embodiment, the transition temperature ($T_g$) of the polymer shell ranges from about −40° C. to about +125° C. In another embodiment, the transition temperature ($T_g$) of the polymer shell ranges from about 0° C. to about +75° C., and in another embodiment, from about 35° C. to about 50° C.

As used herein, $T_g$ is the glass transition temperature as calculated by the Fox equation: copolymer $T_g=1/(Wa/(T_g A)+Wb(T_g B)+\ldots)$ where Wa=weight fraction of monomer A in the copolymer and $T_g A$ is the homopolymer $T_g$ value of monomer A, Wb=weight fraction of monomer B and $T_g B$ is the homopolymer $T_g$ value of monomer B, etc.

In another embodiment, the present disclosure relates to a method of encapsulating pigments. Such method includes the step of dispersing a pigment in an aqueous solution to form a pigment dispersion, adding monomers to the pigment dispersion, adding the cross-linking agent to the pigment dispersion, and polymerizing the monomers in the presence of the pigment to form an encapsulated pigment. While the present method for encapsulating pigment generally includes dispersing the pigment, adding monomers to the pigment dispersion, adding the cross-linking agent to the pigment dispersion, and polymerizing the monomers to form the encapsulated pigment, it is understood that one skilled in the art may modify the present method while still providing the present encapsulated pigments.

In one embodiment, the monomers described herein can be polymerized in situ to form an encapsulating polymer in the presence of the pigment such that the pigment becomes encapsulated by the encapsulating polymer. Additionally, in an embodiment, the mixture can have a monomer to pigment ratio of from about 0.25:1 to about 5:1. In one embodiment, the monomer to pigment ratio can be from about 0.5:1 to about 3:1. In another embodiment, the monomer to pigment ratio can be from about 1:1 to about 3:1.

Even though the process steps have been described in a certain order, such steps are not limited to such an order, nor are the embodiments described herein meant to be limited to any such order, unless specifically stated. For example, the step of adding the cross-linking agent has been described after the step of adding the monomers. However, such steps may be performed in any order or may be combined. For example, adding the monomers and adding the cross-linking agent can be performed simultaneously or adding the monomers and adding the cross-linking agent reagent can be performed sequentially. Additionally, the present methods described herein can further include the step of preparing the cross-linking agent before incorporation into the pigment dispersion.

Additionally, in an embodiment, the present methods can provide a fully encapsulated pigment and/or a substantially uniform encapsulated pigment. In one embodiment, the step of polymerizing can be performed devoid of a surfactant. Alternately, the method can further include adding a surfactant prior to polymerizing. In another embodiment, the method can be devoid of shearing. Alternately, the method can further include shearing.

Further, the present methods can be used to provide a specific polymer structure. As such, in an embodiment, the polymers encapsulating the pigments described herein have a block copolymer structure. Additionally, in another embodiment, the polymers encapsulating the pigments have blocked structure or, in one aspect, can have a random structure. When referring to copolymer, such a copolymer includes any polymer having more than one monomer.

Thus, in an embodiment, the encapsulated pigment particulates can be further stabilized by addition of surfactants. As such, in one embodiment, the encapsulated pigment particulates further include a reactive surfactant during the polymerization process. In an embodiment, the reactive surfactant contains hydrophobic moieties that can be covalently bound to the surface of the encapsulated pigment particulate. Additionally, such reactive surfactant can be incorporated during the polymerization via appropriate organic groups, e.g., a vinyl group, such that the surface of the encapsulated pigment contains the reactive surfactant.

In an embodiment, the reactive surfactant contains hydrophilic groups that allow the encapsulated pigment particulate to be dispersed and/or stabilized in an aqueous medium. The hydrophilic groups can be anionic, cationic, nonionic, or zwitterionic. For example, suitable anionic groups include sulfonate, phosphonate, and carboxylate groups; suitable cationic groups include amine groups; and suitable nonionic groups include polyethelyene oxide, imidazole and amido groups. As such, in an embodiment, the reactive surfactants are functionalized ethylene glycol acrylates, including the Sipomer® series of surfactants from Rhodia.

In an embodiment, the polymer shell of the present invention can be prepared by mixing monomers together to form a monomer mixture. In an embodiment, water insoluble initiators are added to the monomer mixture to avoid phase separation. In another embodiment, water insoluble initiators are added to the mixture, for easy handling, just before the beginning of the polymerization step.

In an embodiment, generating the polymer on the surface of the pigment can be carried out by adding an initiator which contacts the polymer and monomer coated pigments, or by adding a heat sensitive initiator to the to the discontinuous phase which can be activated by heating the coated particles after formation. In some embodiments, a bridging layer can be juxtaposed between the pigment core and the polymeric shell. In an embodiment, the monomer mixture is brought under high shear, to make the desired particle size. The high shear conditions can be generated by any known method, including sonification and/or micro-fluidization. This mixture is thus heated to higher temperature to polymerize the monomers.

The teachings of the present invention also include incorporation of the polymer-encapsulated pigments in inks and coating formulations and their uses. This being stated, while the emphasis herein is toward application in thermal ink-jet printing, it is recognized that the encapsulation chemistry and process taught in the present invention is equally applicable to other printing and coating technologies wherein pigmented colorants or other particulates are applied or otherwise imaged onto to a substrate. Discussion of thermal ink-jet technology is provided because it is known to have more stringent requirements for effective jetting. Thus, the teachings of this invention are generally applicable to any particulate application wherein a polymeric encapsulation of the pigment is desired. The fundamental teachings are, therefore, not bound by the particular composition of the monomer mix, the properties of the capsule, particle definition, dispersion medium or application.

Thus, in an embodiment, the present disclosure relates to an ink-jet ink, including an ink vehicle and a polymer-encapsulated pigment such as defined above. As used herein, "liquid vehicle" or "ink vehicle" refers to the fluid in which the encapsulated pigments of the present disclosure are dispersed to form ink-jet inks in accordance with embodiment of the present invention. Many liquid vehicles and vehicle components are known in the art. Typical ink vehicles can include a mixture of a variety of different agents, such as co-solvents, buffers, biocides, sequestering agents, viscosity modifiers, and water.

In an embodiment, the encapsulated pigment, including an ink vehicle and a polymer-encapsulated pigment such as defined above, is present in the ink composition in an amount representing from about 0.5 wt % to about 40 wt % by total weight of the ink composition. In another embodiment, the encapsulated pigment is present, in the ink composition, in an amount representing from about 1 wt % to about 20 wt % and, in an embodiment, in an amount representing from about 2 wt % to about 6 wt % by total weight of the ink composition.

In an embodiment, liquid vehicle formulations that can be used with the polymer encapsulated pigments described herein can include water, and, in another embodiment, liquid vehicle formulations can include one or more co-solvents present in total amount ranging from about 5 wt % to about 50 wt %.

In an embodiment, one or more non-ionic, cationic, and/or anionic surfactants can be present. Such surfactants are present in the range of from 0 wt % to 5 wt %. The balance of the formulation can be purified water, or other vehicle components known in the art, such as biocides, viscosity modifiers, materials for pH adjustment, sequestering agents, preservatives, and the like. In an embodiment, the liquid vehicle is predominantly water.

Non-limiting examples of classes of co-solvents that can be used can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homolog of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include trimethylolpropane, 2-pyrrolidinone, and 1,5-pentanediol.

One or more of many surfactants can also be used as are known by those skilled in the art of ink formulation and may be alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like. In an embodiment, surfactant can be added in the range from 0 wt % to 5 wt %. In an embodiment, inks of the present invention can have a viscosity from about 1.5 cps to about 6 cps.

Consistent with the formulation of this invention, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (RT. Vanderbilt Co.), Proxel (ICI America), and combinations thereof. In an embodiment, sequestering agents, such as EDTA (ethylene diamine tetra acetic acid), may be included to eliminate the deleterious effects of heavy metal impurities, and buffer solutions may be used to control the pH of the ink. From 0 wt % to 2 wt %, for example, can be used. In an embodiment, viscosity modifiers and buffers may also be present, as well as other additives known to those skilled in the art to modify properties of the ink as desired. Such additives can be present at from 0 wt % to 20 wt %.

In an embodiment, the disclosed ink-jet ink can be used to print an image. Accordingly, a method of printing an image can include thermally ink-jetting an ink-jet ink onto a substrate to form an image. The media substrate referred herein can be of any type known or used in the printing field. In a specific embodiment, the media substrate is coated with a polymer-based swellable coating or an inorganic particulate-based coating.

In an embodiment, it is believed that the use of the ink composition containing the polymer-encapsulated pigments such as described herein and in accordance with the above embodiments provides several benefits. For example, polymer-encapsulated pigments tend to reduce the number of total particles in solution and their combined surface areas such that the pigment suspension, e.g., ink viscosity can thus be reduced. Encapsulation also prevents pigment separation when applied to a substrate, e.g., when ink is printed on media substrate, such that durability and optical density are more optimized. Furthermore, it is believed that the ink compositions containing the polymer-encapsulated pigments such as described herein are also capable of enhanced decap performance. The term "decap", as referred herein, means the ability of the inkjet ink to readily eject from the print head, upon prolonged exposure to air. It is to be understood that all of the materials of the ink composition are present in effective amounts so that the combination achieves the above characteristics when printed. Furthermore, it is believed that the use of cross-linking agent in the polymer-encapsulated pigments improved printability performances without affecting print properties.

In an embodiment, the composition described herein is directed for printing ink-jet images using commercially-available ink-jet printers, such as those suitable for printing pigment-based ink-jet inks manufactured by Hewlett-Packard Company, Palo Alto, Calif. The ink-jet inks of the present invention can include pigment colorants such as yellow, cyan, pale cyan, magenta, pale magenta, gray, orange, green, purple, pink, red, blue, black, and other known pigment colors.

The following examples illustrate embodiments of the invention that are presently best known. However, it is to be understood that the following is only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following example provides further detail in connection with what is presently deemed to be the most practical and preferred embodiments of the invention.

EXAMPLE 1

Encapsulation of Pigment with Polymer

This shell polymer was prepared by polymerizing methyl methacrylate, butyl acrylate and methacrylic acid (MMA/BA/MAA) monomers, in the ratio of 65.5/28.5/6 by weight, in toluene at 95° C. The solid polymer was then obtained by precipitating the mixture in hexane and followed by drying it in the vacuum oven. The resulting polymer (2.4 g) was dissolved in a monomer mixture of methyl methacrylate, butyl acrylate, methacrylic acid, and hydroxyethyl acrylate (MMA/BA/MAA/HEA) in the ratio 65.5/26/6/2.5 (9.6 g).

This solution was mixed with isooctylmercaptopropionate (IOMP) (0.09 g), hexadecane (0.3 g), azobisisobutyronitrile (0.3 g) and 10% sodium dodecylsulfate (4.8 g) and shaken in view of obtaining an emulsion. Water (10 ml) was then added and then transferred to Blue 2G-D® dispersion (60 g) (obtained from Clariant) while stirring. About water (20 ml) was thus added to transfer the emulsion completely. This mixture was stirred for 4 hours and then micro-fluidized at 80 psi with three passes. The solution was then collected and heated to 75° C. in the nitrogen atmosphere for 22.5 hours. After polymerization is complete, the solution is cooled and neutralized to a pH of 8.5 with potassium hydroxide solution. The solution was filtered with 200 mesh filter to obtain a solid % of 14.2%.

EXAMPLE 2

Encapsulation of Pigment Particles with Polymer and Cross-Linking Agent

The method according to Example 1 was repeated under identical conditions along with 1 g of a cross-linking agent (ethylene glycol dimethacrylate). The final composition contains a solid percentage of 15.8 wt %.

EXAMPLE 3

Filterability

The encapsulated pigment compositions obtained according to Example 1 and according to Example 2 were filtered with a 1 micron syringe filter.

With the encapsulated pigment of example 1, only one third of this reaction mixture was filtered. The fact that only one third of the solution can be filtered demonstrates that encapsulated pigments without cross-linkers present a "hairy" structure, under high concentrated surfactant conditions, which prevents good filterability. The encapsulated pigment obtained according to example 2 was filtered with easy force using a 1 micron size syringe filter. See Table A below. This filter step demonstrates the rugged structure of the resulting encapsulated pigment-particles. Thus, the filterability with a 1 micron syringe filter is very good for the cross-linking encapsulated pigments. The filterability of encapsulated particles using a micron size syringe filter illustrates the shear stability of encapsulated particles. Indeed, a smooth filtration correlates with a good shear stability of the encapsulated pigment particles and thus reflects particles having better printing performances.

TABLE A

| Encapsulated pigment sample | Amount of cross-linking (%) | Filter-ability # | Amount filtered | shear stability |
|---|---|---|---|---|
| Example 1 | 0 | Hard | ⅓ of sample | Poor |
| Example 2 | 1 | Easy | All the sample | Very good |

EXAMPLE 4

Ink Compositions Containing Encapsulated Pigment

Table B below illustrates ink compositions containing encapsulated pigment according to one embodiment of the present invention. All ratios are expressed in weight percentage of the total composition.

TABLE B

|  | Ink composition A | Ink composition B |
|---|---|---|
| 2-Hydroxyethyl-2-Pyrollidinone (Co-Solvents) | 20% | 20% |
| Surfynol ® (Air Products) (Surfactants) | 1% | 1% |
| Encapsulated Pigment according to example 1 | 6% | — |
| Encapsulated Pigment according to example 2 | — | 6% |
| Water | Up to 100% | Up to 100% |

EXAMPLE 5

Ink Composition Performance on Decap Test

The quality of a given ink being able to recover normal printing characteristics after sitting idle in an inkjet nozzle for a given period of time is referred to as "decap". The ink decap time is measured as the amount of time that an ink printhead may be left uncapped before the printer nozzles no longer fire properly, potentially because of clogging or plugging.

Generally, the nozzle(s) may become clogged/plugged by a viscous plug that forms in the nozzle(s) as a result of water loss, crusting of the ink, and/or crystallization of the dye in and/or around any of the nozzles. If a nozzle has plugged, ink droplets ejected through the nozzle's orifice may be misdirected, which may adversely affect print quality. The orifice may also become completely blocked, and as a result, the ink droplets may not pass through the affected nozzle. Ink decap times are typically measured over short and long time periods. The short-time decap generally determines how long the printhead can be uncapped before drop quality degrades below the quality obtained with a freshly uncapped print head. Various print/image defects may result from this drop quality degradation due to decap. To counteract decap effects, the printer service routine requires the idle nozzles to spit on a regular basis into the waste container (spittoon) to avoid printing defects. In order to achieve good print image quality, while maintaining or improving throughput and saving ink, it is desirable to keep the short-time decap as long as possible, and to use as few spits as possible to refresh the nozzles. On the other hand, long-time decap determines how long a printhead can be stored in an uncapped state, before nozzles are no longer readily recoverable by the printer's servicing routines. In particular, it determines attributes of the printhead, such as, for example, the storage stability. Long-time decap is desirable for inks so that nozzles are able to be left uncapped and unused for extended periods of time, while the printheads can still be revived by servicing.

Decap testing was performed for ink composition A and B by allowing the printhead nozzles containing each given sample to idle for a given time and then determining how many spits of the nozzles were necessary to recover normal printing characteristics. The more spits it took to recover, the worse the printhead performance is for a given ink at a given time. (Decap values below 4 spits are considered good, up to 10 spits are acceptable, and above 10 spits are considered unacceptable.)

The Decap test is performed to determine printing characteristics for inks A and B. The results, illustrated in Table C, determine the number of spits it takes for a pen to recover after idling for 7 seconds and at 12 seconds (a lower number means the ink is more printable).

According to the results, it is clear that compositions with encapsulated pigment containing cross-linking polymer exhibit good decap performance and thus exhibit greater printing characteristics.

TABLE C

| Encapsulated pigment sample | Printability at 48 kHz | |
|---|---|---|
|  | Score at 7 sec | Score at 12 sec |
| Ink Composition A | 5 | 7 |
| Ink Composition B | 2 | 3 |

EXAMPLE 6

Examples of Cross-Linking Agent

| | |
|---|---|
| Ethylene glycol dimethacrylate, | 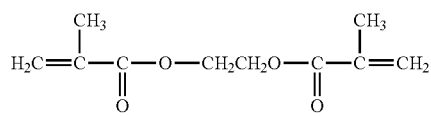 |
| Di(ethylene glycol) dimethacrylate | 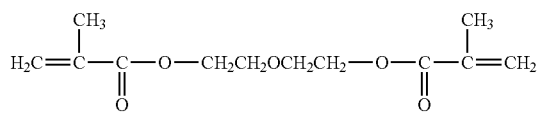 |
| Triethylene glycol dimethacrylate | 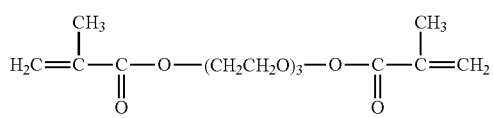 |
| Pentaerythritol triacrylate | 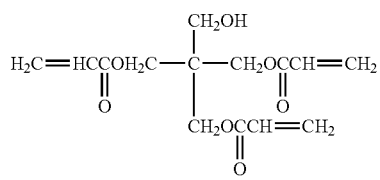 |
| Pentaerythritol tetracrylate | 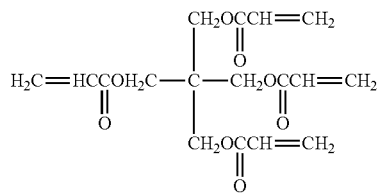 |
| Bisphenol A dimethacrylate | 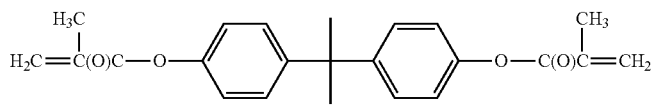 |
| 1,6-Hexanediol diacrylate | 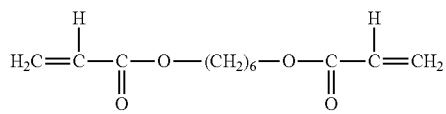 |
| 1,6-Hexanediol dimethacrylate | 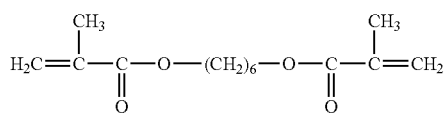 |
| 1,6-Hexanediol divinyl ether | 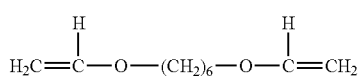 |
| N,N'-Ethylenebis(acrylamide) | 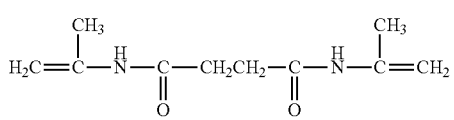 |
| Diallyl maleate | H$_2$C=HCH$_2$CO(O)CHC=CHC(O)OCH$_2$CH=CH$_2$ |
| Diallyl phthalate | 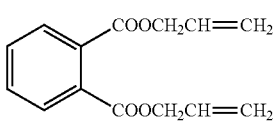 |

| | |
|---|---|
| 1,3-divinylbenzene | 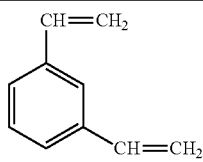 |
| 1,4-divinylbenzene | 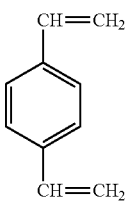 |

The invention claimed is:

1. A method for encapsulating pigment, the method comprising the steps of:
   dispersing a pigment in a first aqueous solution to form a pigment dispersion;
   adding a cross-linking agent to the pigment dispersion, the cross-linking agent having formula I or II:

$$CH_2=C(R)-X-C(R)=CH_2 \quad (I)$$

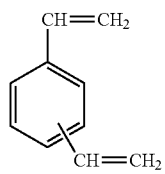 (II)

wherein X is (C(O)O—R'—O(O)C), (O—R'—O), (NH—C(O)—R'—C(O)NH), (C(O)NH—R'—NHC(O)), (NH—R'—NH) or (CH$_2$—C(O)O—R'—OC(O)—CH$_2$), wherein R' is a divalent linking group selected from the group consisting of alkenyl, arylene, alkylene, alkenoxy or alkynoxy groups, and wherein R is H or an alkyl group;
   adding a second solution including a monomer mixture to the pigment dispersion; and
   polymerizing the monomer mixture in the presence of the pigment to form an encapsulated pigment;
   wherein forming the second solution comprises the steps of:
     polymerizing a mixture of methyl methacrylate, butyl acrylate, and methacrylic acid monomers in toluene at 95° C., wherein the methyl methacrylate, butyl acrylate, and methacrylic acid monomers are present in a weight ratio of 65.5:28.5:6;
     precipitating the polymerized mixture in hexane to form a precipitate;
     drying the precipitate to obtain a polymer;
     dissolving the polymer in the monomer mixture of methyl methacrylate, butyl acrylate, hydroxyethyl acrylate, and methacrylic acid, wherein the methyl methacrylate, butyl acrylate, hydroxyethyl acrylate, and methacrylic acid are present in a weight ratio of 65.5:26:2.5:6, and wherein the monomer mixture is present in an amount four times an amount of the polymer;
     adding 0.09 g isooctylmercaptopropionate, 0.3 g hexadecane, 0.3 g azobisisobutyronitrile, and 10% sodium dodecylsulfate to the second solution;
     shaking the second solution; and
     adding water to the second solution.

2. The method as defined in claim 1, wherein the cross-linking agent is ethylene glycol dimethacrylate.

3. The method as defined in claim 1, wherein the second solution comprises:
   2.4 g of the polymer;
   9.6 g of the monomer mixture;
   4.8 g of the 10% sodium dodecylsulfate; and
   10 mL of the water.

4. The method as defined in claim 3, wherein the cross-linking agent is ethylene glycol dimethacrylate in an amount of 1 g.

5. The method as defined in claim 1, wherein the second solution is added to 60 g of the pigment dispersion.

6. The method as defined in claim 5, further comprising: adding additional water to the second solution and the pigment dispersion.

7. The method as defined in claim 1, wherein the polymerizing step comprises:
   stirring the second solution and the pigment dispersion;
   micro-fluidizing the second solution and the pigment dispersion; and then
   heating the second solution and the pigment dispersion to 75° C. in a nitrogen atmosphere for 22.5 hours.

8. The method as defined in claim 7, wherein the stirring takes place for 4 hours, and the micro-fluidizing takes place at 80 psi with three passes.

* * * * *